(12) United States Patent
Zhang et al.

(10) Patent No.: US 11,640,763 B2
(45) Date of Patent: May 2, 2023

(54) SYSTEMS AND METHODS FOR RECOMMENDING A PICKUP LOCATION

(71) Applicant: BEIJING DIDI INFINITY TECHNOLOGY AND DEVELOPMENT CO., LTD., Beijing (CN)

(72) Inventors: Long Zhang, Beijing (CN); Xiaodong Huang, Beijing (CN); Xudong Zhang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 192 days.

(21) Appl. No.: 17/227,423

(22) Filed: Apr. 12, 2021

(65) Prior Publication Data

US 2021/0233410 A1    Jul. 29, 2021

Related U.S. Application Data

(63) Continuation of application No. 16/751,172, filed on Jan. 23, 2020, now Pat. No. 10,977,948, which is a
(Continued)

(51) Int. Cl.
*G08G 1/00* (2006.01)
*G06Q 10/02* (2012.01)

(52) U.S. Cl.
CPC ............. *G08G 1/202* (2013.01); *G06Q 10/02* (2013.01)

(58) Field of Classification Search
CPC ...... G08G 1/202; G06Q 10/02; G06Q 10/047; G06Q 50/30
See application file for complete search history.

(56) References Cited

U.S. PATENT DOCUMENTS 8,738,277 B1   5/2014   Kurosawa et al.
9,304,007 B2   4/2016   Gearhart et al.
(Continued)

FOREIGN PATENT DOCUMENTS

CN    107015988 A        8/2017
CN    109074621 A   *  12/2018    ........... B60N 2/0248
(Continued)

OTHER PUBLICATIONS

International Search Report in PCT/CN2017/098319 dated May 17, 2018, 4 pages.
(Continued)

*Primary Examiner* — Basil T. Jos
(74) *Attorney, Agent, or Firm* — Metis IP LLC

(57) ABSTRACT

The present disclosure relates to systems and methods for determining a pickup location. The systems may perform the methods to receive a request or an intention for a first transportation service that is allowed to combine with a second transportation service from a terminal association with a service requester, the request or the intention including an origin location of the first transportation service and a destination of the first transportation service; obtain a plurality of candidate locations; for each of the plurality of candidate locations, determine a matching index value of the candidate location based on the origin location or the destination, wherein the matching index value is a probability of becoming a pickup location of the first transportation service; select one or more pickup locations from the plurality of candidate locations based on the matching index value; and transmit the one or more pickup locations to the terminal.

19 Claims, 8 Drawing Sheets

Related U.S. Application Data continuation of application No. PCT/CN2017/098319, filed on Aug. 21, 2017.

(56) References Cited

U.S. PATENT DOCUMENTS

| | | |
|---|---|---|
| 9,448,083 B2 | 9/2016 | Loftus et al. |
| 2014/0278691 A1 | 9/2014 | Schenken |
| 2014/0278961 A1 | 9/2014 | Kitano |
| 2018/0328747 A1 | 11/2018 | Farmer et al. |

FOREIGN PATENT DOCUMENTS

| | | |
|---|---|---|
| TW | 201719561 A | 6/2017 |
| WO | 2017100719 A1 | 6/2017 |

OTHER PUBLICATIONS

Written Opinion in PCT/CN2017/098319 dated May 17, 2018, 3 pages.

* cited by examiner

SYSTEMS AND METHODS FOR RECOMMENDING A PICKUP LOCATION

CROSS-REFERENCE TO RELATED APPLICATIONS

This application is a continuation of U.S. application Ser. No. 16/751,172, filed on Jan. 23, 2020, which is a continuation of International Application No. PCT/CN2017/098319, filed on Aug. 21, 2017, the contents of each of which are incorporated herein by reference to its entirety.

TECHNICAL FIELD

This application generally relates to an online carpool transportation service, and in particular, a recommendation of a pickup location for a carpool service requestor.

BACKGROUND

A carpool transportation service refers to an arrangement that combines two or more transportation services into a new transportation service. The carpool transportation service may improve the traffic capacity. In existing systems and methods for carpool, a driver may pick up a passenger at a location determined by the passenger, which may cause some problems such as inefficiency and a bad user experience. For example, the location may be inconvenient for the driver. As another example, if the driver is unfamiliar with the location, the driver has to ask the passenger through a smartphone. Therefore, it is desirable to provide systems and methods for recommending a pickup location to a passenger to improve the efficiency and the user experience.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, a system may include one or more storage media and one or more processors configured to communicate with the one or more storage media. The one or more storage media may include a set of instructions for modulating one or more pulse parameters. When the one or more processors executing the set of instructions, the one or more processors may be directed to perform one or more of the following operations. The one or more processors may receive first signals from a terminal associated with a service requestor at a time point, the first signals including a first portion of structured data encoding a request or an intention for a first transportation service that is allowed to combine with a second transportation service, a second portion of the structured data encoding an origin location of the first transportation service, and a third portion of the structured data encoding a destination of the first transportation service. The one or more processors may transmit second signals to access the storage medium to read a plurality of candidate locations. For each of the plurality of candidate locations, the one or more processors may determine a matching index value of the candidate location based on the origin location or the destination, wherein the matching index value is a probability of becoming a pickup location of the first transportation service. The one or more processors may select one or more pickup locations from the plurality of candidate locations based on the matching index value. The one or more processors may transmit third signals encoding the one or more pickup locations to the terminal.

In some embodiments, the plurality of candidate locations may be within a predetermined distance from the origin location.

In some embodiments, to determine the matching index value the one or more processors may determine a walking cost associated with the origin location and the candidate location. The one or more processors may determine a convenience index associated with the destination and the candidate location. The one or more processors may determine a combination probability associated with finding a third transportation service to combine with the first transportation service. The one or more processors may determine the matching index value of the candidate location based on at least one of the walking cost, the convenience index or the combination probability.

In some embodiments, to determine the walking cost the one or more processors may determine a first route based on the origin location and the candidate location. The one or more processors may determine a walking distance based on the first route. The one or more processors may determine an estimated walking time based on the first route. The one or more processors may determine a direct distance based on the origin location and the candidate location. The one or more processors may determine a first number of historical requests associated with the candidate location. The one or more processors may determine the walking cost based on at least one of the walking distance, the estimated walking time, the direct distance or the first number.

In some embodiments, to determine the convenience index the one or more processors may determine a second route based on the candidate location and the destination. The one or more processors may determine a driving distance based on the second route. The one or more processors may determine an estimated driving time based on the second route. The one or more processors may determine a first direction from the origin location to the destination. The one or more processors may determine a second direction from the origin location to the candidate location. The one or more processors may determine an angle between the first direction and the second direction. The one or more processors may determine the convenience index based on at least one of the driving distance, the estimated driving time or the angle.

In some embodiments, to determine the combination probability the one or more processors may determine a first determination that there is no transportation service of which a pickup location is the candidate location at the time point. The one or more processors may determine a second number of historical requests associated with the candidate location and the time point in response to the first determination. The one or more processors may determine the combination probability based on the second number.

In some embodiments, the one or more processors may be further directed to determine that a carpool transportation service is available for an area that the origin location locates in.

According to a second aspect of the present disclosure, a method may include one or more of the following operations. The one or more processors may receive first signals from a terminal associated with a service requestor at a time point, the first signals including a first portion of structured data encoding a request or an intention for a first transportation service that is allowed to combine with a second transportation service, a second portion of the structured data encoding an origin location of the first transportation service, and a third portion of the structured data encoding a destination of the first transportation service. The one or more processors may transmit second signals to access the storage medium to read a plurality of candidate locations. For each of the plurality of candidate locations, the one or more processors may determine a matching index value of the candidate location based on the origin location or the destination, wherein the matching index value is a probability of becoming a pickup location of the first transportation service. The one or more processors may select one or more pickup locations from the plurality of candidate locations based on the matching index value. The one or more processors may transmit third signals encoding the one or more pickup locations to the terminal.

According to a third aspect of the present disclosure, a non-transitory computer readable medium may comprise at least one set of instructions. The at least one set of instructions may be executed by one or more processors of a computer server. The one or more processors may receive first signals from a terminal associated with a service requestor at a time point, the first signals including a first portion of structured data encoding a request or an intention for a first transportation service that is allowed to combine with a second transportation service, a second portion of the structured data encoding an origin location of the first transportation service, and a third portion of the structured data encoding a destination of the first transportation service. The one or more processors may transmit second signals to access the storage medium to read a plurality of candidate locations. For each of the plurality of candidate locations, the one or more processors may determine a matching index value of the candidate location based on the origin location or the destination, wherein the matching index value is a probability of becoming a pickup location of the first transportation service. The one or more processors may select one or more pickup locations from the plurality of candidate locations based on the matching index value. The one or more processors may transmit third signals encoding the one or more pickup locations to the terminal.

According to a fourth aspect of the present disclosure, a system may comprise a communication module configured to receive first signals from a terminal associated with a service requestor at a time point and transmit second signals encoding one or more pickup locations to the terminal, the first signals including a first portion of structured data encoding a request or an intention for a first transportation service that is allowed to combine with a second transportation service, a second portion of the structured data encoding an origin location of the first transportation service, and a third portion of the structured data encoding a destination of the first transportation service; a candidate location determining module configured to transmit third signals to access a storage medium to read a plurality of candidate locations; an index determining module configured to determine a matching index value for each of the plurality of candidate locations based on the origin location or the destination, wherein the matching index value is a probability of the candidate location of being a pickup location of the first transportation service; and a pickup location determining module configured to select the one or more pickup locations from the plurality of candidate locations based on the matching index value.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
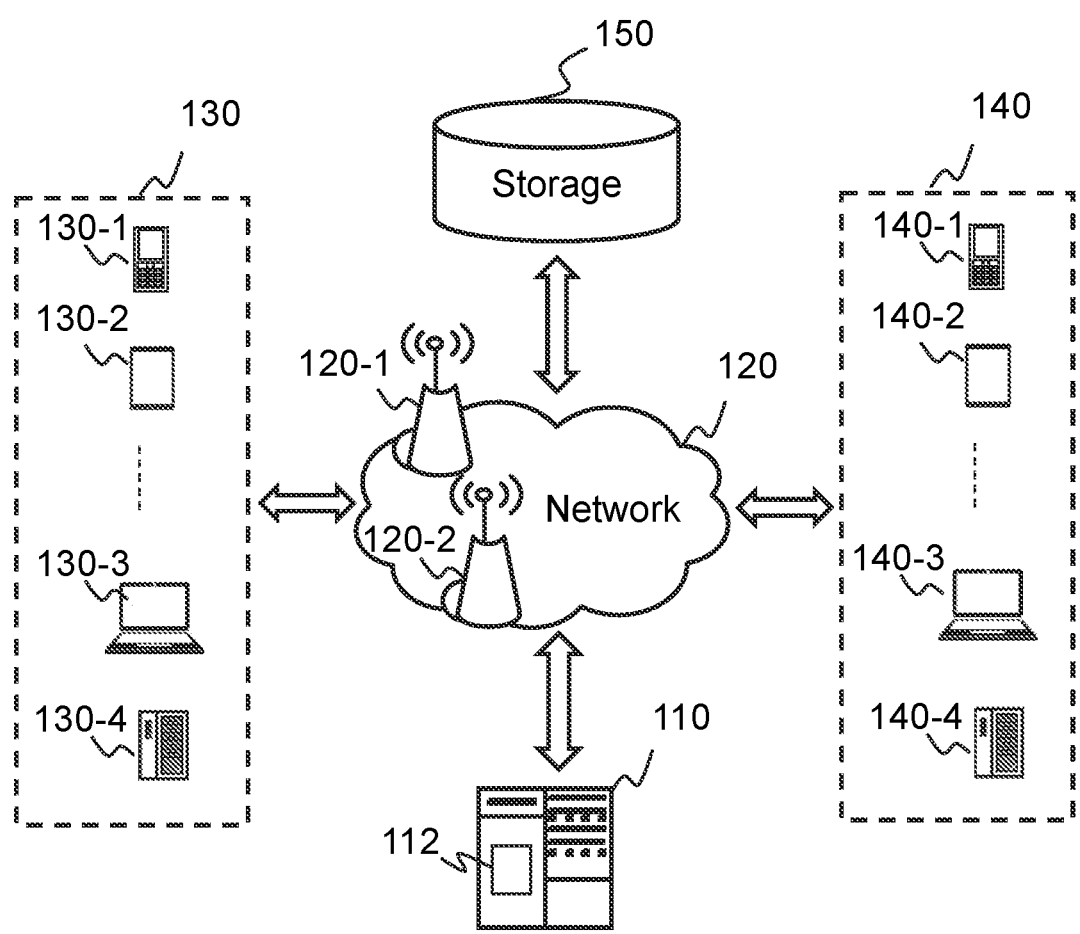
FIG. 1 is a schematic diagram of an exemplary online on-demand transportation service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding recommending a pickup location to a passenger that requests a carpool transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for transmitting and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for recommending a pickup location to a passenger that requests a carpool transportation service. In some embodiments, when a server of an online on-demand transportation service platform receives a request for a transportation service from a passenger, or the server detects that the passenger intends to request a transportation service, the server may determine a pickup location for the passenger to get on board. The server may obtain a plurality of candidate locations close to the passenger (e.g., the plurality of candidate locations may be within 200 meters from the passenger). The server may determine the plurality of candidate locations in advance. For each candidate location, the server may determine a probability of being the pickup location of the passenger. The server may determine the probability based on a score of the user experience of walking from the origin to the candidate location, a score of the user experience of driving from the candidate location to the destination, and a probability of finding a shareable transportation service to combine with the transportation service in the candidate location. The server may select the candidate location with the greatest probability of being the pickup location of the passenger as the pickup location and transmit the pickup location to the passenger's smartphone to notify the passenger of the pickup location.

It should be noted that online on-demand transportation service, such as online carpool service, is a new form of service rooted only in post-Internet era. It provides technical solutions to users and service providers that could raise only in post-Internet era. In the pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). If a driver wants to provider a carpool service, the driver has to ask a passenger face to face and determine whether the carpool service is possible to be provided to the passenger by experience of the driver. Online carpool service, however, obtains transaction requests and finds combinable transaction requests in real-time and automatically. The carpool service also allows a user of the service to real-time and automatic distribute a service request to a vast number of individual service providers (e.g., taxi) distance away from the user and allows a plurality of service providers to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a schematic diagram of an exemplary online on-demand transportation service system 100 according to some embodiments of the present disclosure. The online on-demand transportation service system 100 may include a server 110, a network 120, a requestor terminal 130, a provider terminal 140, and a storage 150. The server 110 may include a processing engine 112.

In some embodiments, the server 110 may manage carpool transportation services for service requestors and service providers. In some embodiments, the transportation service may be a service of taking a subject from one location to another location using a vehicle. The subject may include passengers and/or goods. For example, the transportation service may be a taxi service or a delivery service. The vehicle of the transportation systems may include a taxi, a private car, a hitch, a bus, a bike, an electric bicycle, a tricycle, a motorcycle, a train, a bullet train, a high speed rail, a subway, a vessel, an aircraft, a spaceship, a hot-air balloon, a driverless vehicle, or the like, or any combination thereof. The carpool transportation service may refer to an arrangement that combines two or more transportation services into anew transportation service. For example, the server 110 may combine two taxi services into a new transportation service. As another example, the server 110 may combine two delivery services into a new transportation services. As still another example, the server 110 may combine a taxi service and a delivery service into a new transportation service.

In some embodiments, the transportation service may be a real-time transportation service. A real-time transportation service may be a service that the requestor wishes to receive the transportation service at the present moment or at a defined time reasonably close to the present moment for an ordinary person in the art, so that a service provider is required to depart immediately or substantially immediately after the server 110 receives the service request. For example, a taxi service may be a real-time service if the defined time is shorter than a threshold value, such as 1 minute, 5 minutes, or 10 minutes.

In some embodiments, the transportation service may be a service that needs to make an appointment, which refers to a service that the requestor wishes to receive the service at a time reasonably long from the present moment for the ordinary person in the art, so that a service provider is not required to depart immediately or substantially immediately after the server 110 receives the service request. For example, a passenger may need to reserve a taxi service if the time between the current time and the service time is longer than a threshold value, such as 20 minutes, 2 hours, or 1 day.

The time threshold may be a fixed time period or may be adjustable depending on different situations. For example, in rush hours (e.g., 7:00 am-9:00 am), the time threshold may be relatively long (e.g., 10 minutes) because it may take a service provider longer time to arrive the service requestor's location; whereas in other hours (e.g., 10:00 am-12:00 am), the time threshold may be relatively short (e.g., 5 minutes) as the service provider may need shorter time to pick-up a service requestor.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may be directly connected to the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine one or more pickup locations and transmit the one or more pickup locations to the requestor terminal 130. In some embodiments, the processing engine 112 may include one or more processing engines (e.g., single-core processing engine(s) or multi-core processor(s)). Merely byway of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the online on-demand transportation service system 100 (e.g., the server 110, the requestor terminal 130, the provider terminal 140, and the storage 150) may transmit information and/or data to another component(s) of the online on-demand transportation service system 100 via the network 120. For example, the server 110 may obtain/acquire a service request from the requestor terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online on-demand transportation service system 100 may be connected to the network 120 to exchange data and/or information.

In some embodiments, a requestor may be a user of the requestor terminal 130. In some embodiments, the user of the requestor terminal 130 may be someone other than the requestor. For example, user A of the requestor terminal 130 may use the requestor terminal 130 to transmit a service request for user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftGon™, a Fragments™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may transmit positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the online on-demand transportation service system 100 (e.g., the server 110, the requestor terminal 130, the provider terminal 140). One or more components in the online on-demand transportation service system 100 may access the data or instructions stored in the storage 150 via the network 120. In some embodiments, the storage 150 may be directly connected to or communicate with one or more components in the online on-demand transportation service system 100 (e.g., the server 110, the requestor terminal 130, the provider terminal 140). In some embodiments, the storage 150 may be part of the server 110.

Figure 2:
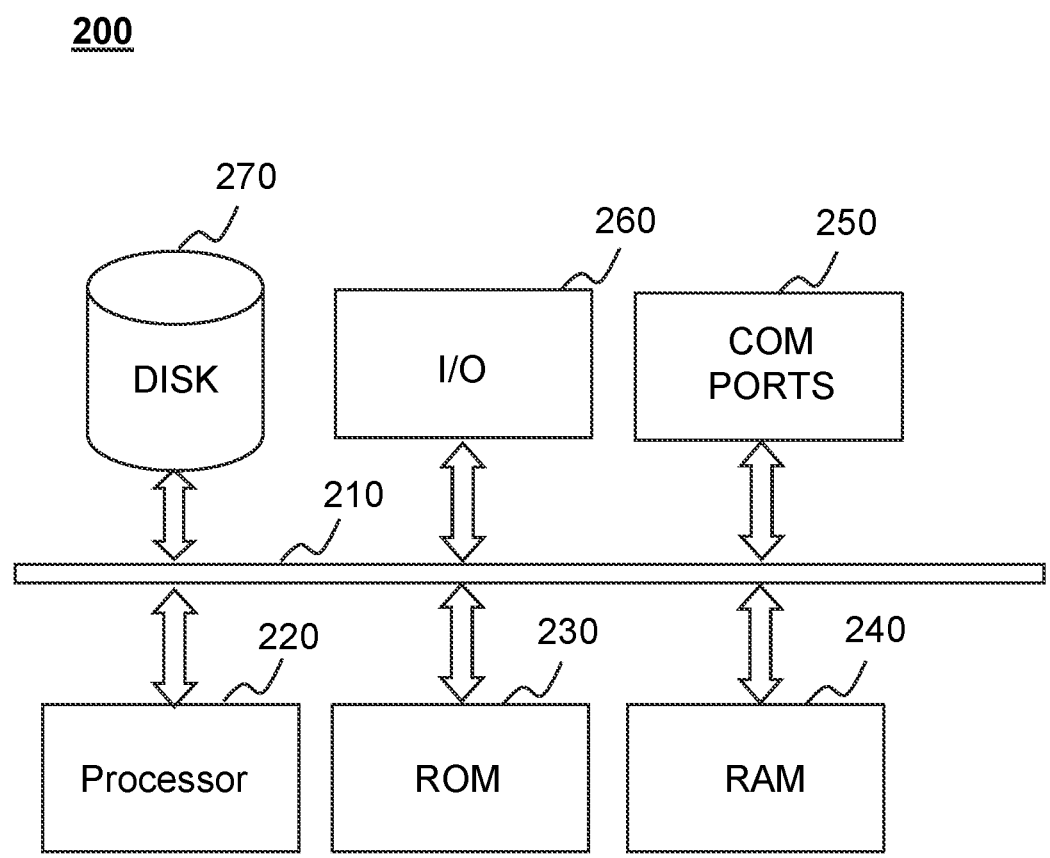
FIG. 2 is a schematic diagram illustrating exemplary hardware and software components of a computing device according to some embodiments of the present disclosure.

FIG. 2 is a schematic diagram illustrating exemplary hardware and software components of a computing device 200 on which the server 110 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special-purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or any other type of non-transitory storage medium to be executed by the processor 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one processor is illustrated in the computing device 200. However, it should be noted that the computing device 200 in the present disclosure may also include multiple processors, and thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
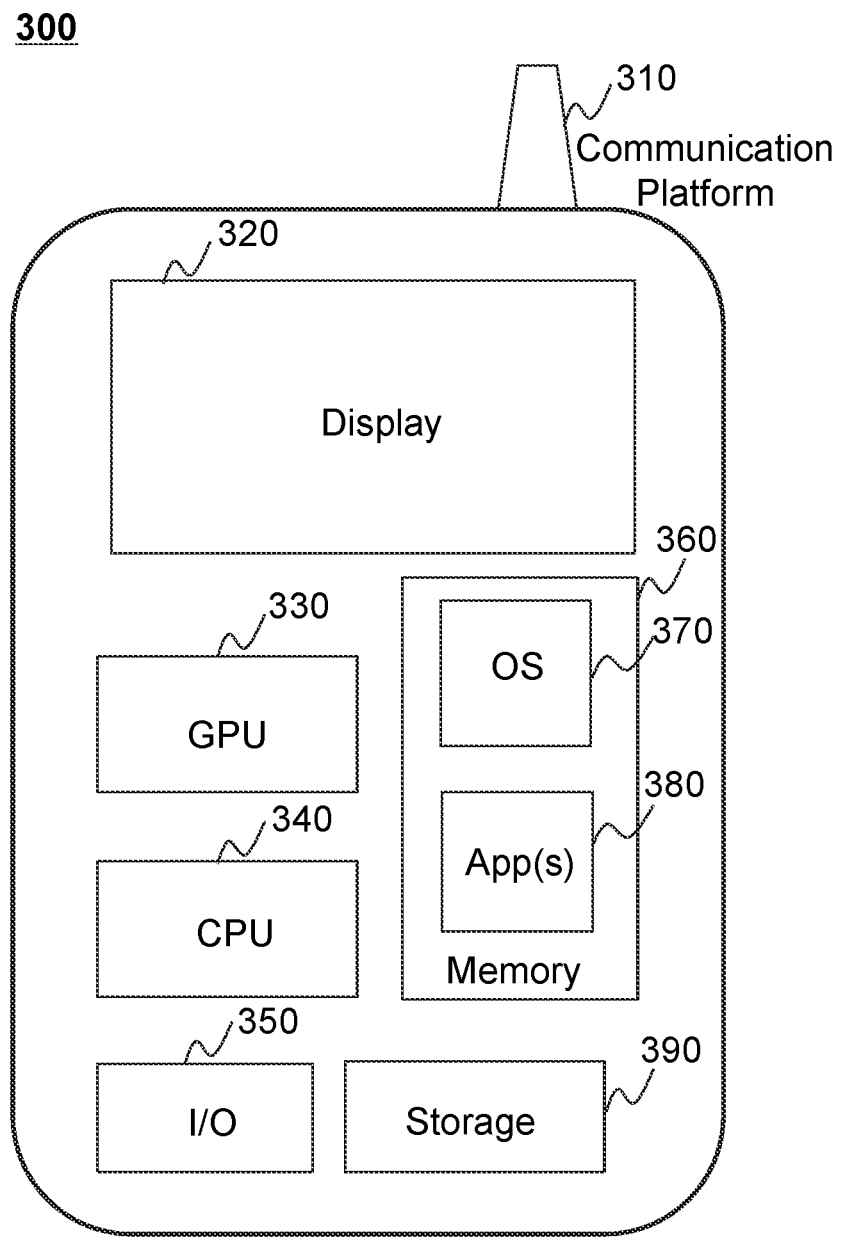
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the requestor terminal 130 and/or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to an online carpool transportation service or other information from the server 110, and transmitting information relating to an online carpool transportation service or other information to the server 110. User interactions with the information stream may be achieved via the I/O 350 and provided to the server 110 and/or other components of the online on-demand transportation service system 100 via the network 120.

Figure 4:
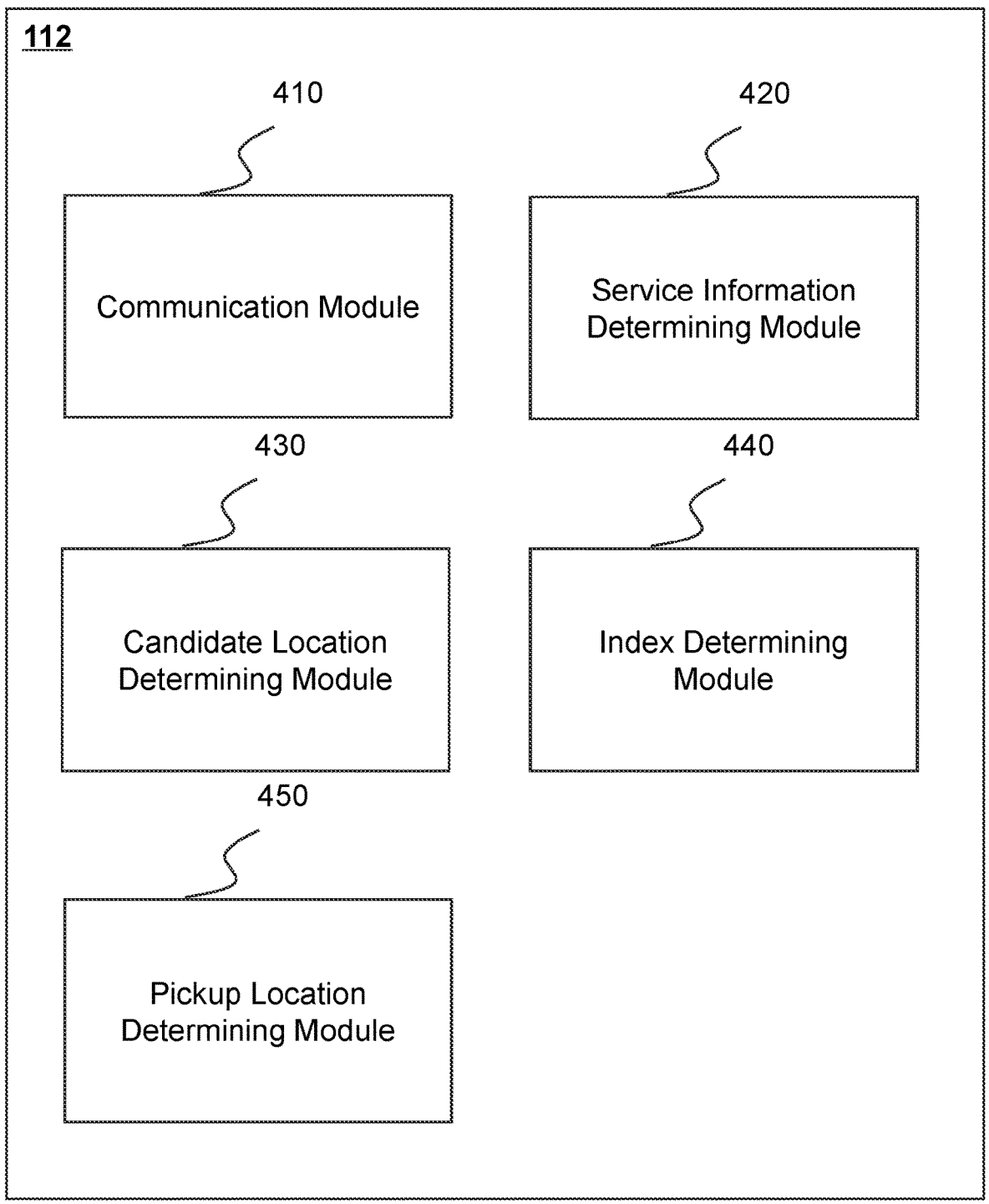
FIG. 4 is schematic block diagram illustrating an exemplary processing engine 112 according to some embodiments of the present disclosure.

FIG. 4 is a schematic diagram illustrating an exemplary processing engine 112 according to some embodiments of the present disclosure. As shown in FIG. 4, the processing engine 112 may include a communication module 410, a service information determining module 420, a candidate location determining module 430, an index determining module 440, and a pickup location determining module 450. The communication module 410 may establish communication with one or more components of the online on-demand transportation service system 100 (e.g., the requestor terminal 130, the provider terminal 140, and the storage 150). For example, the communication module 410 may receive a request or an intention for a transportation service from a service requestor. As another example, the communication module 410 may transmit one or more pickup locations to a service requestor.

The service information determining module 420 may determine an origin location of the transportation service and/or a destination of the transportation service. In some embodiments, the request or the intention received by the communication module 410 may include the origin location of the transportation service and/or the destination of the transportation service. The service information determining module 420 may determine the origin location and the destination based on the request or the intention.

The candidate location determining module 430 may obtain a plurality of predetermined locations and/or determine one or more candidate locations based on the origin location and the predetermined locations. In some embodiments, the server 110 may determine the plurality of predetermined locations in an area (e.g., the city of Beijing) in advance. The predetermined locations may be used to determine one or more pickup locations for a specific transportation service. The predetermined locations may be stored in the storage 150 or a storage medium (e.g., the disk 270, the ROM 230, or the RAM 240) of the server 110. In some embodiments, the one or more candidate locations may be one or more the predetermined locations within a predetermined distance (e.g., 500 meters) from the origin. The predetermined distance may be a fixed distance or may be adjustable depending on different situations. The candidate location determining module 430 may access the storage 150 and/or the storage medium to obtain the predetermined locations to determine the one or more candidate locations.

The index determining module 440 may determine a matching index value of at least one of the candidate locations based on the origin location and/or the destination. The matching index value of a candidate location may be the probability of the candidate location being a pickup location of the transportation service.

The pickup location determining module 450 may determine one or more pickup locations based on the matching index values.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the communication module 410 may be divided into two units. The first unit may be configured to receive a request or an intention from a service requestor. The second unit may be configured to transmit one or more pickup locations to the service requestor.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may further include a storage module (not shown in FIG. 4). The storage module may be configured to store data generated during any process performed by any component of in the processing engine 112 (e.g., the communication module 410, the service information determining module 420, the candidate location determining module 430, the index determining module 440, or the pickup location determining module 450). As another example, each of components of the processing engine 112 may include a storage device. Additionally or alternatively, the components of the processing engine 112 may share a common storage device.

One of ordinary skill in the art would understand that when an element of the online on-demand transportation service system 100 performs, the element may perform through electrical signals (e.g., current) and/or electromagnetic signals. For example, when a requestor terminal 130 transmits out a service request to the server 110, a processor of the requestor terminal 130 may generate an electrical signal encoding the request. The processor of the requestor terminal 130 may then transmit the electrical signal to an output port. If the requestor terminal 130 communicates with the server 110 via a wired network, the output port may be physically connected to a cable, which further transmit the electrical signal to an input port of the server 110. If the requestor terminal 130 communicates with the server 110 via a wireless network, the output port of the requestor terminal 130 may be one or more antennas, which convert the electrical signal to electromagnetic signal. Similarly, a provider terminal 140 may receive an instruction and/or service request from the server 110 via electrical signal or electromagnet signals. Within an electronic device, such as the requestor terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

The communication module 410 may receive a request or an intention for a transportation service from a service requestor. In some embodiments, the requestor terminal 130 of the service requestor (e.g., a passenger's smartphone) may install an application for requesting a transportation service. Through an interface of the application, the requestor terminal 130 may establish a connection and communicate with the online on-demand transportation service system 100. In some embodiments, the service requestor may input an origin location and a destination of the transportation service, and transmit out a request including the origin location and the destination of the transportation service to the communication module 410 via, for example, the network 120. In some embodiments, the application may direct the requestor terminal 130 to constantly monitoring inputs from the service requestor and transmit the input to the communication module 410. As a result, when the service requestor inputs part of the information of the transportation service, such as a destination, the communication module 410 may receive enough information in real-time or substantially real-time to determine an intention of the service requestor. For example, when the service requestor inputs an origin location and a destination of the transportation service and before transmitting out the transportation service request to the communication module 410, the communication module 410 may receive and/or detect the origin location and the destination from the service requestor in real-time or substantially real-time, and determine that the service requestor intends to request the transportation service before receiving a request for the transportation service from the service requestor.

In some embodiments, the communication module 410 may receive service signals from the requestor terminal 130. The service signals may include a first portion of structured data encoding the request or the intention for the transportation service, a second portion of the structured data encoding the origin location of the transportation service, and a third portion of the structured data encoding the destination of the transportation service.

The service information determining module 420 may determine an origin location of the transportation service and a destination of the transportation service. In some embodiments, the request or the intention received by the communication module 410 may include the origin location of the transportation service and/or the destination of the transportation service. The service information determining module 420 may determine the origin location and the destination based on the request or the intention.

The candidate location determining module 430 may obtain a plurality of predetermined locations. In some embodiments, the candidate location determining module 430 may determine the plurality of predetermined locations in an area (e.g., the city of Beijing) in advance. The predetermined locations may be used to determine one or more pickup locations for a specific transportation service. The predetermined locations may be stored in the storage 150 or a storage medium (e.g., the disk 270, the ROM 230, or the RAM 240) of the processing engine 112. The candidate location determining module 430 may access the storage 150 and/or the storage medium to obtain the predetermined locations.

In some embodiments, the candidate location determining module 430 may transmit access signals to access the storage medium to read the plurality of predetermined locations. For example, the candidate location determining module 430 may transmit the access signals to access the storage 150 to read the plurality of predetermined locations.

The candidate location determining module 430 may determine one or more candidate locations based on the origin location and the plurality of predetermined locations. The candidate location determining module 430 may select one or more predetermined locations that are within a predetermined distance (e.g., 500 meters) from the origin location as the candidate location(s). The predetermined distance may be a fixed distance or may be adjustable depending on different situations. For example, if the origin location is in a downtown area (e.g., the Xicheng district in Beijing), the predetermined distance may be relatively short (e.g., 400 meters) because the density of the predetermined locations there may be higher; whereas if the origin location is in a suburban area (e.g., the Changping district in Beijing), the predetermined distance may be relatively long (e.g., 1 kilometer) as the density of the predetermined locations there may be lower.

The index determining module 440 may determine matching index values of the candidate locations based on the origin location and/or the destination. In some embodiments, the index determining module 440 may determine a matching index value for each candidate location. The matching index value of a candidate location may be the probability of the candidate location being a pickup location of the transportation service. The greater the matching index value is, the more suitable the candidate location is to be a pickup location for the transportation service. The matching index value may be in the form of a score, a percentage, a star level, or any suitable form.

In some embodiments, the index determining module 440 may determine the matching index value based on a walking cost, a convenience index, or a combination probability (e.g., as will be described in detail in connection with FIG. 6), or a combination thereof. The walking cost be a measurement associated with walking from the origin location to the candidate location. The convenience index may be a measurement associated with driving from the candidate location to the destination. The combination probability may be a probability of finding one or more shareable transportation services in the candidate location to combine with the transportation service.

The pickup location determining module 450 may determine one or more pickup locations based on the matching index values. In some embodiments, the pickup location determining module 450 may rank the matching index values in ascending order or descending order. In some embodiments, the pickup location determining module 450 may determine one pickup location from the candidate locations based on the matching index values. For example, the pickup location determining module 450 may determine the candidate location having the greatest matching index value as the pickup location of the transportation service. In some embodiments, the pickup location determining module 450 may determine more than one pickup location. For example, the pickup location determining module 450 may determine the top three candidate locations as the pickup locations based on the matching index values.

The communication module 410 may transmit the one or more pickup locations to the service requestor and/or the service provider. In some embodiments, if the pickup location determining module 450 determines one pickup location, the communication module 410 may transmit the pickup location to the service requestor. After receiving the pickup location, the application installed in the requestor terminal 130 of the service requestor (e.g., a smartphone of a passenger) may provide an interface to notify the passenger of the pickup location in the way of text, sound, picture, video, or the like, or any combination thereof. For example, the interface of the application may display a text showing "Please get on board at East Gate of Renmin University." Alternatively or additionally, the communication module 410 may transmit the pickup location to a service provider that provides the transportation service to the service requestor.

In some embodiments, if the pickup location determining module 450 determines more than one pickup location, the communication module 410 may transmit the more than one pickup location to the service requestor. The service requestor may select one from the more than one pickup location. After receiving the more than one pickup location, the application installed in the requestor terminal 130 of the service requestor (e.g., a smartphone of a passenger) may provide an interface to notify the passenger of the more than one pickup location in a way of text, sound, picture, video, or the like, or any combination thereof. For example, the interface of the application may display a list of the more than one pickup location. In the list, the more than one pickup locations may be arranged in ascending order, descending order, or random order. The passenger may select one pickup location from the list. After receiving the instruction of selecting one from the one or more pickup locations, the requestor terminal 130 may transmit the selected pickup location to the processing engine 112. Alternatively or additionally, after receiving the selected pickup location from the requestor terminal 130, the communication module 410 may transmit the selected pickup location to the service provider who provides the transportation service to the service requestor.

In some embodiments, the communication module 410 may transmit location signals encoding the one or more pickup locations to the requestor terminal 130.

In some embodiments, the processing engine 112 may determine whether the carpool transportation service is available for the area in which the origin location locates. The pickup location determining module 450 may determine one or more pickup locations for the service requestor in response to the determination that the carpool transportation service is available in the area. In response to the determination that the carpool transportation service is available for the area that the origin location locates in, the communication module 410 may transmit a message to the requestor terminal 130 to notify the service requestor of the determination.

The index determining module 440 may determine a walking cost of a candidate location. The walking cost may be a measurement associated with walking from the origin location to the candidate location. In some embodiments, the index determining module 440 may determine a score of the walking cost. The greater the score of the walking cost is, the better the user experience of walking from the origin location to the candidate location is. In some embodiments, the index determining module 440 may determine the walking cost based on the walking distance between the origin location and the candidate location, the estimated walking time between the origin location and the candidate location, the direct distance between the origin location and the candidate location, or the number of historical requests of which pickup locations are the candidate location (e.g., as described in detail in connection with FIG. 7), or a combination thereof.

The index determining module 440 may determine a convenience index of the candidate location. The convenience index may be a measurement associated with driving from the candidate location to the destination by the service provider. In some embodiments, the index determining module 440 may determine a score of the convenience index. The greater the score of the convenience index is, the better the user experience of driving from the candidate location to the destination is. In some embodiments, the index determining module 440 may determine the convenience index based on a driving distance between the candidate location and the destination, the estimated driving time between the candidate location and the destination, an angle between a direction from the origin location to the candidate location, a direction from the origin location to the destination (e.g., as will be described in detail in connection with FIG. 8), or a combination thereof.

The index determining module 440 may determine a combination probability of the candidate location. The combination probability may be a probability of finding one or more shareable transportation services in the candidate location to combine with the transportation service. A shareable transportation service may satisfy at least three conditions: the pickup location of the shareable transportation service is the candidate location; a service requestor of the sharable transportation service has not departed from the candidate location (e.g., the service requestor of the shareable transportation service is on the way of going to the candidate location, or the service requestor of the shareable transportation service is waiting for a driver at the candidate location); the destination of the shareable transportation is related to the destination of the transportation service (e.g., the destination of the shareable transportation is on a driving route of the transportation service, the destination of the transportation service is on a driving route of the shareable transportation service, or the destination of the shareable transportation is within a distance from the destination of the transportation service). In some embodiments, the index determining module 440 may determine the combination probability based on the number of shareable transportation services in the candidate location and a carpool capacity. The carpool capacity may be the maximum number of passengers in a vehicle at the same time. The carpool capacity may be a fixed value or may be adjustable depending on different situations. For example, in rush hours (e.g., 7:00 am-9:00 am), the carpool capacity may be relatively great (e.g., 4 passengers) because the demand for service providers may exceed the supply; whereas in other hours (e.g., 10:00 am-12:00 am), the carpool capacity may be relatively small (e.g., 2 passengers) as the supply of service providers may exceed the demand or there may be a balance between demand and supply of service providers.

For the purpose of illustration, the determination of the combination probability may be described using an example below. It should be noted that the determination of the combination probability described below is merely provided for illustration and not intended to limit the scope of the present disclosure. For example, suppose that the number of passengers of a transportation service may be 1. The index determining module 440 may determine that the carpool capacity is 2 passengers. The index determining module 440 may determine three candidate locations (e.g., location A, location B, and location C). The index determining module 440 may determine that there is no shareable transportation service in location A, there is 1 shareable transportation service in location B, and there are 2 shareable transportation services in location A. The index determining module 440 may determine that the combination probability of location B is the greatest and the combination probability of location A is the least.

In some embodiments, for a condition that there is no shareable transportation service in all of the candidate locations, the index determining module 440 may determine the combination probability based on historical requests. For example, the index determining module 440 may access the storage 150 and/or the storage medium (e.g., the ROM 230, the RAM 240) to obtain the number of historical shareable transportation services associated with the time point when the communication module 410 receives the request or the intention for the transportation service from the service requestor and the candidate location. The historical shareable transportation service may satisfy at least three conditions: the pickup location of the historical shareable transportation service is the candidate location; the historical shareable transportation service ended (e.g., the historical shareable transportation service may be cancelled or finished); the destination of the historical shareable transportation is related to the destination of the transportation service (e.g., the destination of the historical shareable transportation is on a driving route of the transportation service, the destination of the transportation service is on a driving route of the historical shareable transportation service, or the destination of the historical shareable transportation is within a distance from the destination of the transportation service). For example, the communication module 410 receives the request or the intention for the transportation service from the service requestor at 9:10 am. The index determining module 440 may obtain historical shareable transportation services of which the request times are in a range from, for example, 9:05 am-9:15 am of every one of the past 5 days.

In some embodiments, the index determining module 440 may determine a score of the combination probability. The greater the score of the combination probability is, the greater the combination probability is, and the more possible it is to find a shareable transportation service in the candidate location to combine with the transportation service.

The index determining module 440 may determine a matching index value based on the walking cost, the convenience index, and the combination probability. The index determining module 440 may determine weights for the walking cost, the convenience index, and the combination probability. In some embodiments, the index determining module 440 may determine the matching index value by determining a weighted average of the walking cost, the convenience index, and the combination probability.

The index determining module 440 may determine a walking route from the origin location to the candidate location.

The index determining module 440 may determine a walking distance based on the walking route. In some embodiments, the walking distance may be the length of the walking route.

The index determining module 440 may determine an estimated walking time based on the walking route. In some embodiments, the index determining module 440 may determine the estimated walking time based on the walking distance, walking speed, condition of the walking route, or the like, or any combination thereof.

In some embodiments, the walking speed may be a fixed speed (e.g., 4 km/h) or may be adjustable depending on different situations. For example, for passengers over 60 years old, the walking speed may be relatively slow (e.g., 3 km/h); for passengers from 20 to 60 years old, the walking speed may be relatively fast (e.g., 4.5 km/h). In some embodiments, the service requestor may input his/her basic information (e.g., a name, a phone number, an age) when the service requestor first uses the application installed in the requestor terminal 130 (e.g., a smartphone of the service requestor) to request a transportation service. The requestor terminal 130 may transmit the basic information to the index determining module 440. After receiving the basic information, the server 110 may store the basic information in the storage 150 and/or the storage medium (e.g., the ROM 230, the RAM 240). When determining the walking speed, the index determining module 440 may access the storage 150 or the storage medium to obtain the basic information of the service requestor and determine the walking speed based on the basic information. In some embodiments, the requestor terminal 130 may determine the walking speed of the service requestor using the positioning technology in the requestor terminal 130 and transmit the walking speed to the index determining module 440 in real time. The condition of the walking route may include the weather, information on events (e.g., a traffic accident, a concert), or the like, or any combination thereof.

The index determining module 440 may determine a direct distance from the origin location to the candidate location.

The index determining module 440 may determine the number of historical requests associated with the candidate location. The number of requests associated with the candidate location may refer to the number of historical requests in a time period (e.g., in the past one month from the time point when the processing engine 112 receives the service request or the intention of the transportation service) of which the pickup locations are the candidate location.

The index determining module 440 may determine a walking cost based on the walking distance, the estimated walking time, the direct distance or the quantity of historical requests associated with the candidate location. In some embodiments, the walking distance, the estimated walking time, the direct distance, and the number of historical requests associated with the candidate location may correspond to a score, respectively. The shorter the walking distance is, the higher the score determined by the index determining module 440 for the walking distance is. The shorter the estimated walking time is, the higher the score determined by the index determining module 440 for the estimated walking time is. The shorter the direct distance is, the higher the score determined by the index determining module 440 for the direct distance is. The greater the number of historical requests associated with the candidate location is, the higher the score determined by the index determining module 440 for the number of historical requests associated with the candidate location is. In some embodiments, the walking distance, the estimated walking time, the direct distance, and the number of historical requests associated with the candidate location may correspond to a weight, respectively. The index determining module 440 may determine the walking cost by determining a weighted average of the walking distance, the estimated walking time, the direct distance, and the number of historical requests associated with the candidate location.

The index determining module 440 may determine a driving route from the candidate location to the destination.

The index determining module 440 may determine a driving distance based on the driving route. The driving distance may refer to the length of the driving route.

The index determining module 440 may determine an estimated driving time based on the driving route. In some embodiments, the index determining module 440 may determine the estimated driving time based on the driving distance, driving speed, the condition of the driving route, or the like, or any combination thereof.

In some embodiments, the driving speed may be a fixed speed (e.g., 40 km/h), or may be adjustable depending on different situations. For example, for a high configuration vehicle (e.g., a BMW™), the driving speed may be relatively great (e.g., 45 km/h); for a low configuration vehicle (e.g., an Alto™), the driving speed may be relatively small (e.g., 35 km/h).

For a condition that the processing engine 112 has allocated a service provider to the service requester, the index determining module 440 may determine the driving speed based on the vehicle of the service provider. In some embodiments, the service provider may input his/her basic information (e.g., a name, a phone number, a vehicle type, a vehicle plate number) when the service provider first uses the application installed in the provider terminal 140 (e.g., a smartphone of the service provider) to provide a transportation service. The provider terminal 140 may transmit the basic information of the service provider to the processing engine 112. After receiving the basic information of the service provider, the processing engine 112 may store the basic information in the storage 150 and/or the storage medium (e.g., the ROM 230, the RAM 240). When determining the driving speed, the index determining module 440 may access the storage 150 or the storage medium to obtain the basic information of the service provider and determine the driving speed based on the basic information of the service provider. Alternatively or additionally, the provider terminal 140 may determine the driving speed of the vehicle using the positioning technology in the provider terminal 140 and transmit the driving speed to the index determining module 440 in real time.

For a condition that the processing engine 112 has not allocated a service provider to the service requester, the index determining module 440 may determine the driving speed based on the default of the processing engine 112 (e.g., 40 km/h).

The condition of the driving route may include the number of vehicles on the driving route, the weather, information on events (e.g., a traffic accident, a concert), or the like, or any combination thereof.

The index determining module 440 may determine the first direction from the origin location to the destination and a second direction from the origin location to the candidate location.

The index determining module 440 may determine an angle between the first direction and the second direction. In some embodiments, the index determining module 440 may determine the angle between the first direction and the second direction in order to determine whether the candidate location and the destination are in two opposite directions of the origin location. If the index determining module 440 determines that the angle is 0°, the candidate location and the destination may be in a same direction of the origin location. If the index determining module 440 determines that the angle is 180°, the candidate location and the destination may be in two opposite directions of the origin location. In this condition, if the service requestor goes to the candidate location to get on board from the origin location, the service requestor may be farther away from the destination, which may cause a bad user experience for the service requestor.

The index determining module 440 may determine a convenience index based on the driving distance, the estimated driving time, or the angle between the first direction and the second direction. In some embodiments, each of the driving distance, the estimated driving time, and the angle may be indicated by a score. The shorter the driving distance is, the higher the score determined by the index determining module 440 for the driving distance is. The shorter the estimated driving time is, the higher the score determined by the index determining module 440 for the estimated driving time is. The smaller the angle is, the higher the score determined by the index determining module 440 for the angle is. In some embodiments, the driving distance, the estimated driving time, and the angle may correspond to a weight, respectively. The index determining module 440 may determine the convenience index by determining a weighted average of the driving distance, the estimated driving time, and the angle.

Figure 5:
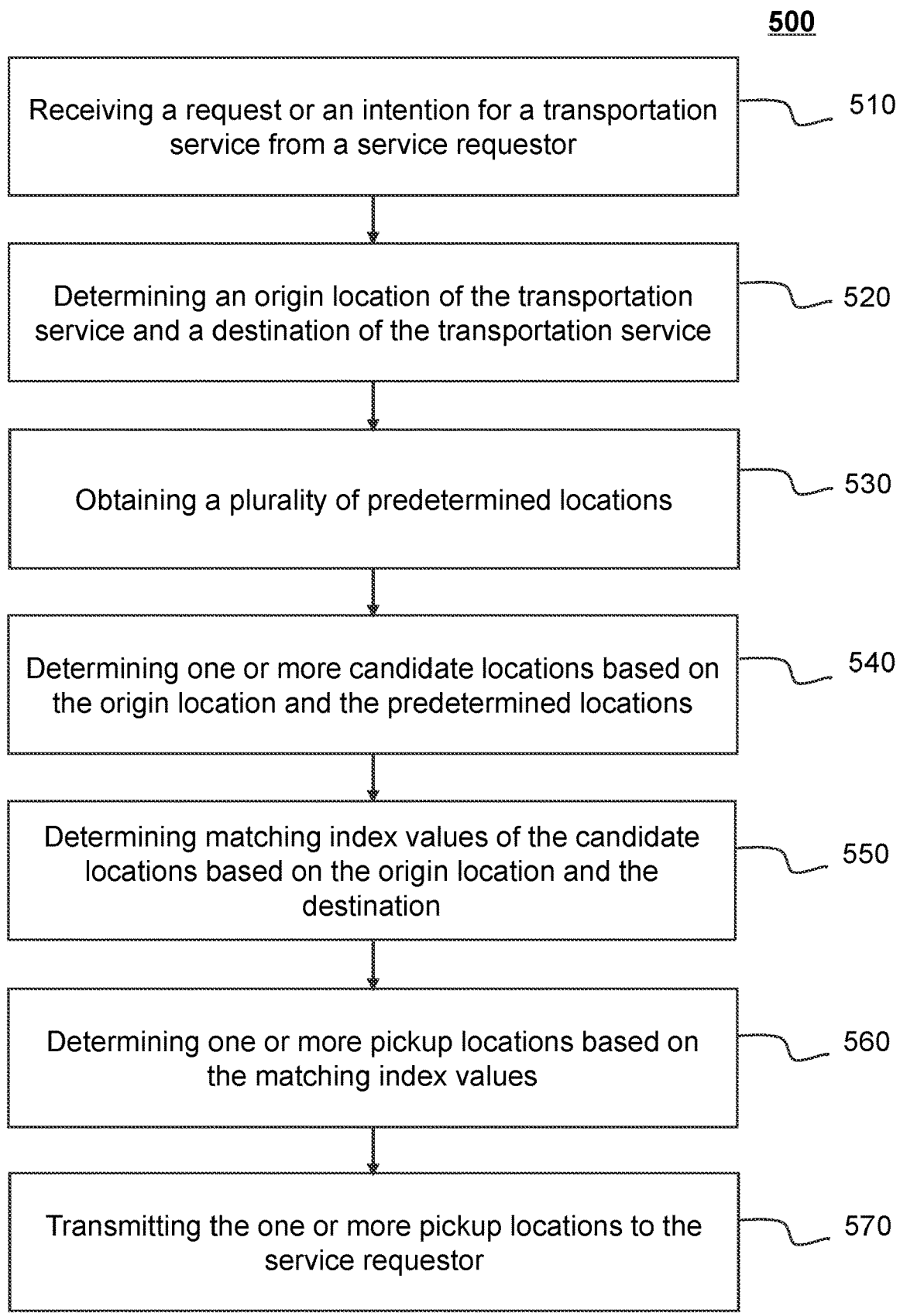
FIG. 5 is a flowchart illustrating an exemplary process for recommending one or more pickup locations according to some embodiments of the present disclosure.

FIG. 5 is a flowchart illustrating an exemplary process 500 for recommending one or more pickup locations according to some embodiments of the present disclosure. In some embodiments, the process 500 may be implemented in the online on-demand transportation service system 100 illustrated in FIG. 1. For example, the process 500 may be stored in the storage 150 and/or the storage device (e.g., the ROM 230, the RAM 240, the disk 270) as a form of instructions, and invoked and/or executed by the server 110 (e.g., the processing engine 112 in the server 110, the processor 220, or one or more modules in the processing engine 112 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processing engine 112 (e.g., the communication module 410) may receive a request or an intention for a transportation service from a service requestor. In some embodiments, the requestor terminal 130 of the service requestor (e.g., a passenger's smartphone) may install an application for requesting a transportation service. Through an interface of the application, the requestor terminal 130 may establish a connection and communicate with the online on-demand transportation service system 100. In some embodiments, the service requestor may input an origin location and a destination of the transportation service, and transmit out a request including the origin location and the destination of the transportation service to the processing engine 112 (e.g., the communication module 410) via, for example, the network 120. In some embodiments, the application may direct the requestor terminal 130 to constantly monitoring inputs from the service requestor and transmit the input to the processing engine 112 (e.g., the communication module 410). As a result, when the service requestor inputs part of the information of the transportation service, such as a destination, the processing engine 112 (e.g., the communication module 410) may receive enough information in real-time or substantially real-time to determine an intention of the service requestor. For example, when the service requestor inputs an origin location and a destination of the transportation service and before transmitting out the transportation service request to the processing engine 112 (e.g., the communication module 410), the processing engine 112 (e.g., the communication module 410) may receive and/or detect the origin location and the destination from the service requestor in real-time or substantially real-time, and determine that the service requestor intends to request the transportation service before receiving a request for the transportation service from the service requestor.

In some embodiments, the processing engine 112 (e.g., the communication module 410) may receive service signals from the requestor terminal 130. The service signals may include a first portion of structured data encoding the request or the intention for the transportation service, a second portion of the structured data encoding the origin location of the transportation service, and a third portion of the structured data encoding the destination of the transportation service.

In 520, the processing engine 112 (e.g., the service information determining module 420) may determine an origin location of the transportation service and a destination of the transportation service. In some embodiments, the request or the intention received by the processing engine 112 (e.g., the communication module 410) may include the origin location of the transportation service and/or the destination of the transportation service. The processing engine 112 (e.g., the service information determining module 420) may determine the origin location and the destination based on the request or the intention.

In 530, the processing engine 112 (e.g., the candidate location determining module 430) may obtain a plurality of predetermined locations. In some embodiments, the processing engine 112 (e.g., the candidate location determining module 430) may determine the plurality of predetermined locations in an area (e.g., the city of Beijing) in advance. The predetermined locations may be used to determine one or more pickup locations for a specific transportation service. The predetermined locations may be stored in the storage 150 or a storage medium (e.g., the disk 270, the ROM 230, or the RAM 240) of the processing engine 112. The processing engine 112 (e.g., the candidate location determining module 430) may access the storage 150 and/or the storage medium to obtain the predetermined locations.

In some embodiments, the processing engine 112 (e.g., the candidate location determining module 430) may transmit access signals to access the storage medium to read the plurality of predetermined locations. For example, the processing engine 112 (e.g., the candidate location determining module 430) may transmit the access signals to access the storage 150 to read the plurality of predetermined locations.

In 540, the processing engine 112 (e.g., the candidate location determining module 430) may determine one or more candidate locations based on the origin location and the plurality of predetermined locations. The processing engine 112 (e.g., the candidate location determining module 430) may select one or more predetermined locations that are within a predetermined distance (e.g., 500 meters) from the origin location as the candidate location(s). The predetermined distance may be a fixed distance or may be adjustable depending on different situations. For example, if the origin location is in a downtown area (e.g., the Xicheng district in Beijing), the predetermined distance may be relatively short (e.g., 400 meters) because the density of the predetermined locations there may be higher; whereas if the origin location is in a suburban area (e.g., the Changping district in Beijing), the predetermined distance may be relatively long (e.g., 1 kilometer) as the density of the predetermined locations there may be lower.

In 550, the processing engine 112 (e.g., the index determining module 440) may determine matching index values of the candidate locations based on the origin location and/or the destination. In some embodiments, the processing engine 112 (e.g., the index determining module 440) may determine a matching index value for each candidate location. The matching index value of a candidate location may be the probability of the candidate location being a pickup location of the transportation service. The greater the matching index value is, the more suitable the candidate location is to be a pickup location for the transportation service. The matching index value may be in the form of a score, a percentage, a star level, or any suitable form.

In some embodiments, the processing engine 112 (e.g., the index determining module 440) may determine the matching index value based on a walking cost, a convenience index, or a combination probability (e.g., as described in detail in connection with FIG. 6), or a combination thereof. The walking cost be a measurement associated with walking from the origin location to the candidate location. The convenience index may be a measurement associated with driving from the candidate location to the destination. The combination probability may be a probability of finding one or more shareable transportation services in the candidate location to combine with the transportation service.

In 560, the processing engine 112 (e.g., the pickup location determining module 450) may determine one or more pickup locations based on the matching index values. In some embodiments, the processing engine 112 (e.g., the pickup location determining module 450) may rank the matching index values in ascending order or descending order. In some embodiments, the processing engine 112 (e.g., the pickup location determining module 450) may determine one pickup location from the candidate locations based on the matching index values. For example, the processing engine 112 (e.g., the pickup location determining module 450) may determine the candidate location having the greatest matching index value as the pickup location of the transportation service. In some embodiments, the processing engine 112 (e.g., the pickup location determining module 450) may determine more than one pickup location. For example, the processing engine 112 (e.g., the pickup location determining module 450) may determine the top three candidate locations as the pickup locations based on the matching index values.

In 570, the processing engine 112 (e.g., the communication module 410) may transmit the one or more pickup locations to the service requestor and/or the service provider. In some embodiments, if the processing engine 112 (e.g., the pickup location determining module 450) determines one pickup location, the processing engine 112 (e.g., the communication module 410) may transmit the pickup location to the service requestor. After receiving the pickup location, the application installed in the requestor terminal 130 of the service requestor (e.g., a smartphone of a passenger) may provide an interface to notify the passenger of the pickup location in the way of text, sound, picture, video, or the like, or any combination thereof. For example, the interface of the application may display a text showing "Please get on board at East Gate of Renmin University." Alternatively or additionally, the processing engine 112 (e.g., the communication module 410) may transmit the pickup location to a service provider that provides the transportation service to the service requestor.

In some embodiments, if the processing engine 112 (e.g., the pickup location determining module 450) determines more than one pickup location, the processing engine 112 (e.g., the communication module 410) may transmit the more than one pickup location to the service requestor. The service requestor may select one from the more than one pickup location. After receiving the more than one pickup location, the application installed in the requestor terminal 130 of the service requestor (e.g., a smartphone of a passenger) may provide an interface to notify the passenger of the more than one pickup location in a way of text, sound, picture, video, or the like, or any combination thereof. For example, the interface of the application may display a list of the more than one pickup location. In the list, the more than one pickup locations may be arranged in ascending order, descending order, or random order. The passenger may select one pickup location from the list. After receiving the instruction of selecting one from the one or more pickup locations, the requestor terminal 130 may transmit the selected pickup location to the processing engine 112. Alternatively or additionally, after receiving the selected pickup location from the requestor terminal 130, the processing engine 112 (e.g., the communication module 410) may transmit the selected pickup location to the service provider who provides the transportation service to the service requestor.

In some embodiments, the processing engine 112 (e.g., the communication module 410) may transmit location signals encoding the one or more pickup locations to the requestor terminal 130.

In some embodiments, the processing engine 112 may determine whether the carpool transportation service is available for the area in which the origin location locates. The processing engine 112 (e.g., the pickup location determining module 450) may determine one or more pickup locations for the service requestor in response to the determination that the carpool transportation service is available in the area. In response to the determination that the carpool transportation service is available for the area that the origin location locates in, the processing engine 112 (e.g., the communication module 410) may transmit a message to the requestor terminal 130 to notify the service requestor of the determination.

Figure 6:
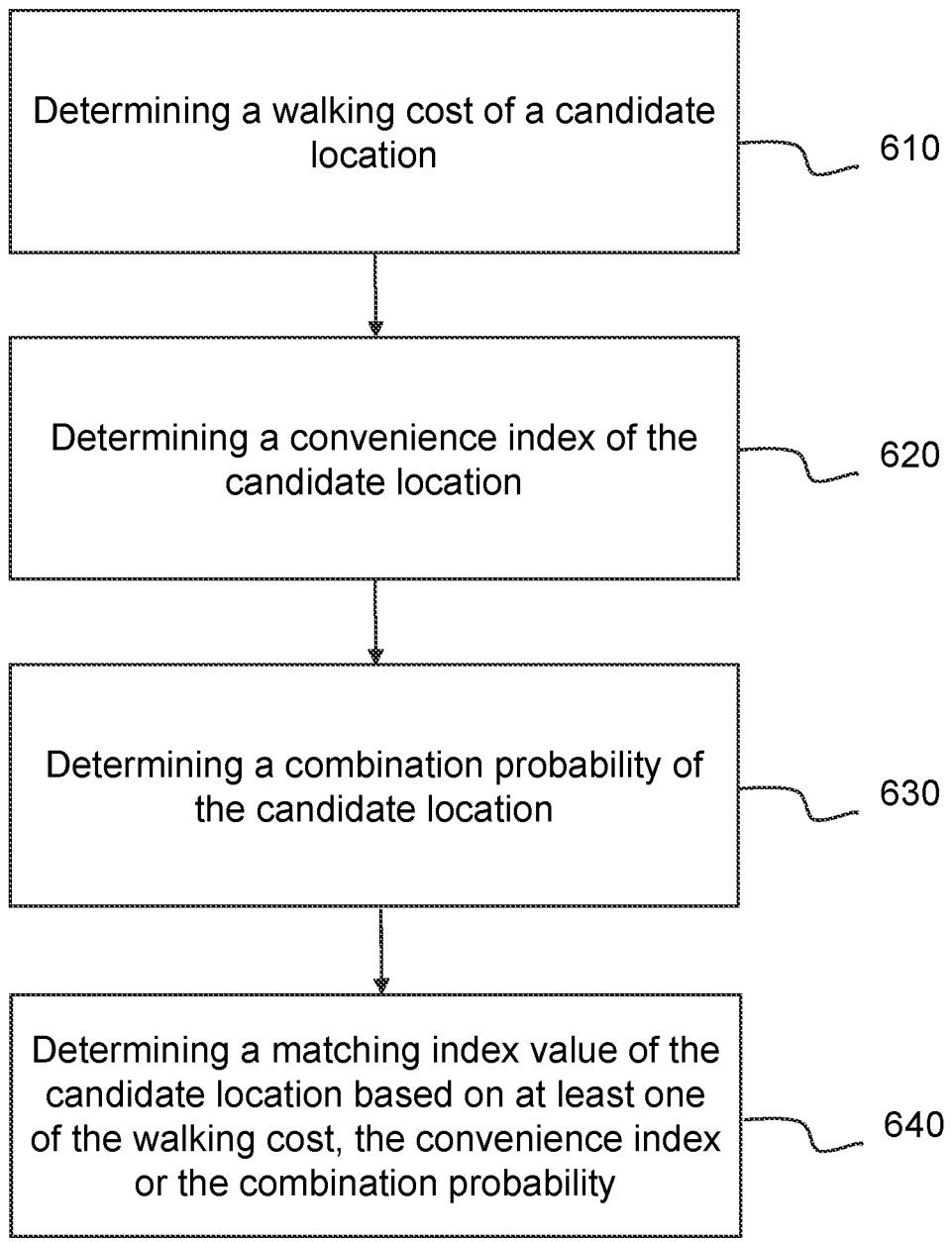
FIG. 6 is a flowchart illustrating an exemplary process for determining a matching index value for a candidate location according to some embodiments of the present disclosure.

FIG. 6 is a flowchart illustrating an exemplary process for determining a matching index value for a candidate location according to some embodiments of the present disclosure. In some embodiments, the process 600 may be implemented in the online on-demand transportation service system 100 illustrated in FIG. 1. For example, the process 600 may be stored in the storage 150 and/or the storage device (e.g., the ROM 230, the RAM 240) as a form of instructions, and invoked and/or executed by the server 110 (e.g., the processing engine 112 in the server 110, the processor 220, or one or more modules in the processing engine 112 illustrated in FIG. 4). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, step 550 illustrated in FIG. 5 may be performed based on the process 600. For one candidate location, the processing engine 112 may perform the process 600 to determine a matching index value. The processing engine 112 may determine a matching index value for each candidate location one by one or simultaneously.

In 610, the processing engine 112 (e.g., the index determining module 440) may determine a walking cost of a candidate location. The walking cost may be a measurement associated with walking from the origin location to the candidate location. In some embodiments, the processing engine 112 (e.g., the index determining module 440) may determine a score of the walking cost. The greater the score of the walking cost is, the better the user experience of walking from the origin location to the candidate location is. In some embodiments, the processing engine 112 (e.g., the index determining module 440) may determine the walking cost based on the walking distance between the origin location and the candidate location, the estimated walking time between the origin location and the candidate location, the direct distance between the origin location and the candidate location, or the number of historical requests of which pickup locations are the candidate location (e.g., as will be described in detail in connection with FIG. 7), or a combination thereof.

In 620, the processing engine 112 (e.g., the index determining module 440) may determine a convenience index of the candidate location. The convenience index may be a measurement associated with driving from the candidate location to the destination by the service provider. In some embodiments, the processing engine 112 (e.g., the index determining module 440) may determine a score of the convenience index. The greater the score of the convenience index is, the better the user experience of driving from the candidate location to the destination is. In some embodiments, the processing engine 112 (e.g., the index determining module 440) may determine the convenience index based on a driving distance between the candidate location and the destination, the estimated driving time between the candidate location and the destination, an angle between a direction from the origin location to the candidate location, a direction from the origin location to the destination (e.g., as will be described in detail in connection with FIG. 8), or a combination thereof.

In 630, the processing engine 112 (e.g., the index determining module 440) may determine a combination probability of the candidate location. The combination probability may be a probability of finding one or more shareable transportation services in the candidate location to combine with the transportation service. A shareable transportation service may satisfy at least three conditions: the pickup location of the shareable transportation service is the candidate location; a service requestor of the sharable transportation service has not departed from the candidate location (e.g., the service requestor of the shareable transportation service is on the way of going to the candidate location, or the service requestor of the shareable transportation service is waiting for a driver at the candidate location); the destination of the shareable transportation is related to the destination of the transportation service (e.g., the destination of the shareable transportation is on a driving route of the transportation service, the destination of the transportation service is on a driving route of the shareable transportation service, or the destination of the shareable transportation is within a distance from the destination of the transportation service). In some embodiments, the processing engine 112 (e.g., the index determining module 440) may determine the combination probability based on the number of shareable transportation services in the candidate location and a carpool capacity. The carpool capacity may be the maximum number of passengers in a vehicle at the same time. The carpool capacity may be a fixed value or may be adjustable depending on different situations. For example, in rush hours (e.g., 7:00 am-9:00 am), the carpool capacity may be relatively great (e.g., 4 passengers) because the demand for service providers may exceed the supply; whereas in other hours (e.g., 10:00 am-12:00 am), the carpool capacity may be relatively small (e.g., 2 passengers) as the supply of service providers may exceed the demand or there may be a balance between demand and supply of service providers.

For the purpose of illustration, the determination of the combination probability may be described using an example below. It should be noted that the determination of the combination probability described below is merely provided for illustration and not intended to limit the scope of the present disclosure. For example, suppose that the number of passengers of a transportation service may be 1. The processing engine 112 (e.g., the index determining module 440) may determine that the carpool capacity is 2 passengers. The processing engine 112 (e.g., the index determining module 440) may determine three candidate locations (e.g., location A, location B, and location C). The processing engine 112 (e.g., the index determining module 440) may determine that there is no shareable transportation service in location A, there is 1 shareable transportation service in location B, and there are 2 shareable transportation services in location A. The processing engine 112 (e.g., the index determining module 440) may determine that the combination probability of location B is the greatest and the combination probability of location A is the least.

In some embodiments, for a condition that there is no shareable transportation service in all of the candidate locations, the processing engine 112 (e.g., the index determining module 440) may determine the combination probability based on historical requests. For example, the processing engine 112 (e.g., the index determining module 440) may access the storage 150 and/or the storage medium (e.g., the ROM 230, the RAM 240) to obtain the number of historical shareable transportation services associated with the time point when the processing engine 112 (e.g., the communication module 410) receives the request or the intention for the transportation service from the service requestor and the candidate location. The historical shareable transportation service may satisfy at least three conditions: the pickup location of the historical shareable transportation service is the candidate location; the historical shareable transportation service ended (e.g., the historical shareable transportation service may be cancelled or finished); the destination of the historical shareable transportation is related to the destination of the transportation service (e.g., the destination of the historical shareable transportation is on a driving route of the transportation service, the destination of the transportation service is on a driving route of the historical shareable transportation service, or the destination of the historical shareable transportation is within a distance from the destination of the transportation service). For example, the processing engine 112 (e.g., the communication module 410) receives the request or the intention for the transportation service from the service requestor at 9:10 am. The processing engine 112 (e.g., the index determining module 440) may obtain historical shareable transportation services of which the request times are in a range from, for example, 9:05 am-9:15 am of every one of the past 5 days.

In some embodiments, the processing engine 112 (e.g., the index determining module 440) may determine a score of the combination probability. The greater the score of the combination probability is, the greater the combination probability is, and the more possible it is to find a shareable transportation service in the candidate location to combine with the transportation service.

In 640, the processing engine 112 (e.g., the index determining module 440) may determine a matching index value based on the walking cost, the convenience index, and the combination probability. The processing engine 112 (e.g., the index determining module 440) may determine weights for the walking cost, the convenience index, and the combination probability. In some embodiments, the processing engine 112 (e.g., the index determining module 440) may determine the matching index value by determining a weighted average of the walking cost, the convenience index, and the combination probability. For example, the processing engine 112 (e.g., the index determining module 440) may determine the matching index value based on Equation (1) below:

$$M = W_{walk}S_{walk} + W_{drive}S_{drive} + W_{comb}S_{comb} \qquad (1),$$

wherein M refers to the score of the matching index value, $S_{walk}$ refers to the score of the walking cost, $S_{drive}$ refers to the score of the convenience index, $S_{comb}$ refers to the score of the combination probability, $W_{walk}$ refers to the weight of the walking cost, $W_{drive}$ refers to the weight of the convenience index, and $W_{comb}$ refers to the weight of the combination probability.

In some embodiment, the processing engine 112 (e.g., the index determining module 440) may perform step 610, step 620, and step 630 in any order. In some embodiments, the processing engine 112 (e.g., the index determining module 440) may perform step 610, step 620, and step 630 simultaneously.

Figure 7:
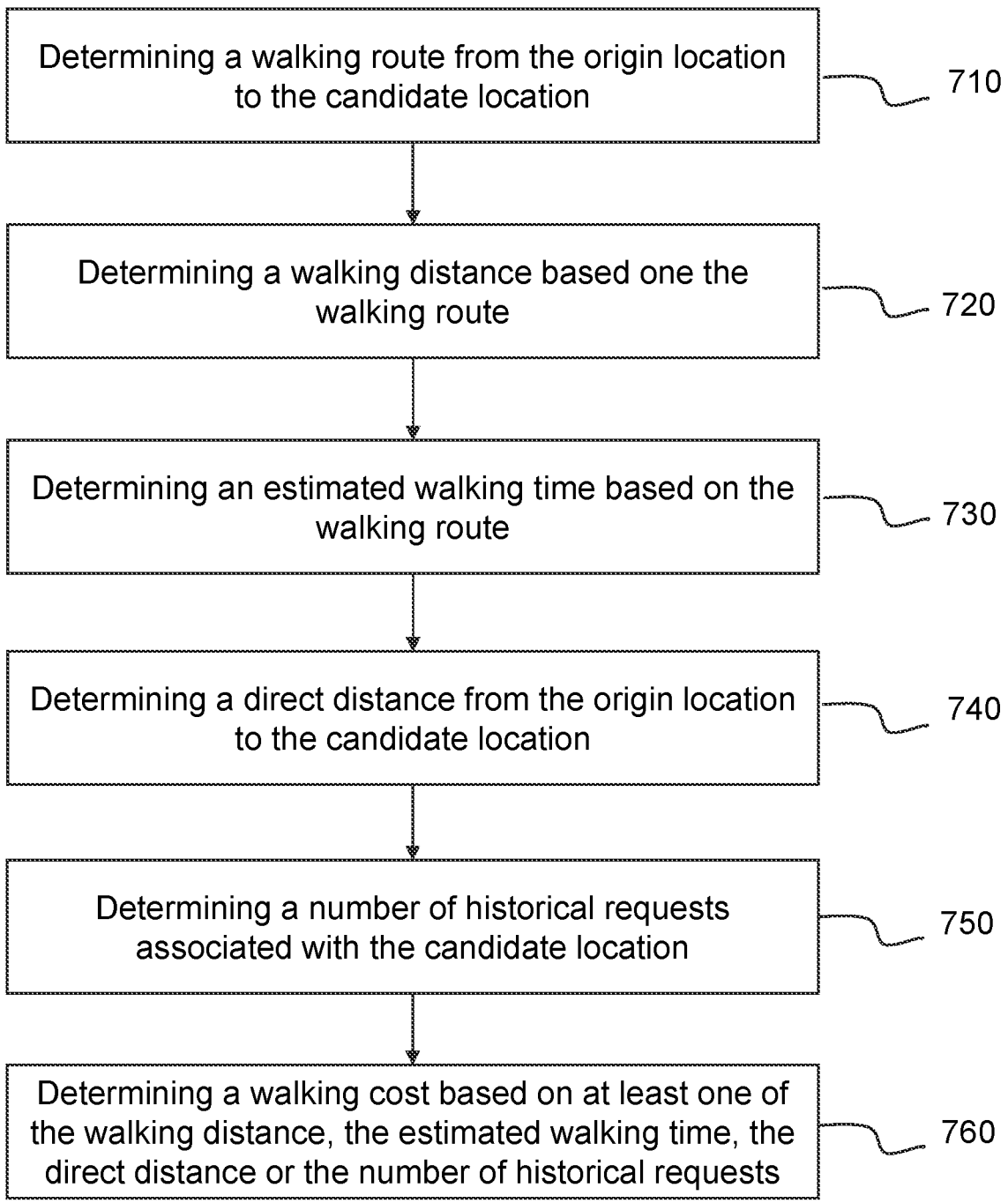
FIG. 7 is a flowchart illustrating an exemplary process for determining a walking cost for a candidate location according to some embodiments of the present disclosure.

FIG. 7 is a flowchart illustrating an exemplary process for determining a walking cost for a candidate location according to some embodiments of the present disclosure. In some embodiments, the process 700 may be implemented in the online on-demand transportation service system 100 illustrated in FIG. 1. For example, the process 700 may be stored in the storage 150 and/or the storage device (e.g., the ROM 230, the RAM 240) as a form of instructions, and invoked and/or executed by the server 110 (e.g., the processing engine 112 in the server 110, the processor 220, or one or more modules in the processing engine 112 illustrated in FIG. 4). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, step 610 illustrated in FIG. 6 may be performed based on the process 700.

In 710, the processing engine 112 (e.g., the index determining module 440) may determine a walking route from the origin location to the candidate location.

In 720, the processing engine 112 (e.g., the index determining module 440) may determine a walking distance based on the walking route. In some embodiments, the walking distance may be the length of the walking route.

In 730, the processing engine 112 (e.g., the index determining module 440) may determine an estimated walking time based on the walking route. In some embodiments, the processing engine 112 (e.g., the index determining module 440) may determine the estimated walking time based on the walking distance, walking speed, condition of the walking route, or the like, or any combination thereof.

In some embodiments, the walking speed may be a fixed speed (e.g., 4 km/h) or may be adjustable depending on different situations. For example, for passengers over 60 years old, the walking speed may be relatively slow (e.g., 3 km/h); for passengers from 20 to 60 years old, the walking speed may be relatively fast (e.g., 4.5 km/h). In some embodiments, the service requestor may input his/her basic information (e.g., a name, a phone number, an age) when the service requestor first uses the application installed in the requestor terminal 130 (e.g., a smartphone of the service requestor) to request a transportation service. The requestor terminal 130 may transmit the basic information to the processing engine 112 (e.g., the index determining module 440). After receiving the basic information, the server 110 may store the basic information in the storage 150 and/or the storage medium (e.g., the ROM 230, the RAM 240). When determining the walking speed, the processing engine 112 (e.g., the index determining module 440) may access the storage 150 or the storage medium to obtain the basic information of the service requestor and determine the walking speed based on the basic information. In some embodiments, the requestor terminal 130 may determine the walking speed of the service requestor using the positioning technology in the requestor terminal 130 and transmit the walking speed to the processing engine 112 (e.g., the index determining module 440) in real time. The condition of the walking route may include the weather, information on events (e.g., a traffic accident, a concert), or the like, or any combination thereof.

In 740, the processing engine 112 (e.g., the index determining module 440) may determine a direct distance from the origin location to the candidate location.

In 750, the processing engine 112 (e.g., the index determining module 440) may determine the number of historical requests associated with the candidate location. The number of requests associated with the candidate location may refer to the number of historical requests in a time period (e.g., in the past one month from the time point when the processing engine 112 receives the service request or the intention of the transportation service) of which the pickup locations are the candidate location.

In 760, the processing engine 112 (e.g., the index determining module 440) may determine a walking cost based on the walking distance, the estimated walking time, the direct distance or the quantity of historical requests associated with the candidate location. In some embodiments, the walking distance, the estimated walking time, the direct distance, and the number of historical requests associated with the candidate location may correspond to a score, respectively. The shorter the walking distance is, the higher the score determined by the processing engine 112 (e.g., the index determining module 440) for the walking distance is. The shorter the estimated walking time is, the higher the score determined by the processing engine 112 (e.g., the index determining module 440) for the estimated walking time is. The shorter the direct distance is, the higher the score determined by the processing engine 112 (e.g., the index determining module 440) for the direct distance is. The greater the number of historical requests associated with the candidate location is, the higher the score determined by the processing engine 112 (e.g., the index determining module 440) for the number of historical requests associated with the candidate location is. In some embodiments, the walking distance, the estimated walking time, the direct distance, and the number of historical requests associated with the candidate location may correspond to a weight, respectively. The processing engine 112 (e.g., the index determining module 440) may determine the walking cost by determining a weighted average of the walking distance, the estimated walking time, the direct distance, and the number of historical requests associated with the candidate location. For example, the processing engine 112 (e.g., the index determining module 440) may determine the walking cost based on Equation (2) below:

$$S_{walk}=W_{wd}S_{wd}+W_{wt}S_{wt}+W_{ld}S_{ld}+W_{h}S_{h} \quad (2),$$

wherein $S_{walk}$ refers to the score of the walking cost, $S_{wd}$ refers to the score of the walking distance, $S_{wt}$ refers to the score of the estimated walking time, $S_{ld}$ refers to the score of the direct distance, $S_h$ refers to the score of the quantity of historical requests associated with the candidate location, $W_{wd}$ refers to the weight of the walking distance, $W_{wt}$ refers to the weight of the estimated walking time, $W_{ld}$ refers to the weight of the direct distance, and $W_h$ refers to the weight of the quantity of historical requests associated with the candidate location.

In some embodiment, the processing engine 112 (e.g., the index determining module 440) may perform steps 720-750 in any order. In some embodiments, the processing engine 112 (e.g., the index determining module 440) may perform steps 720-750 simultaneously.

Figure 8:
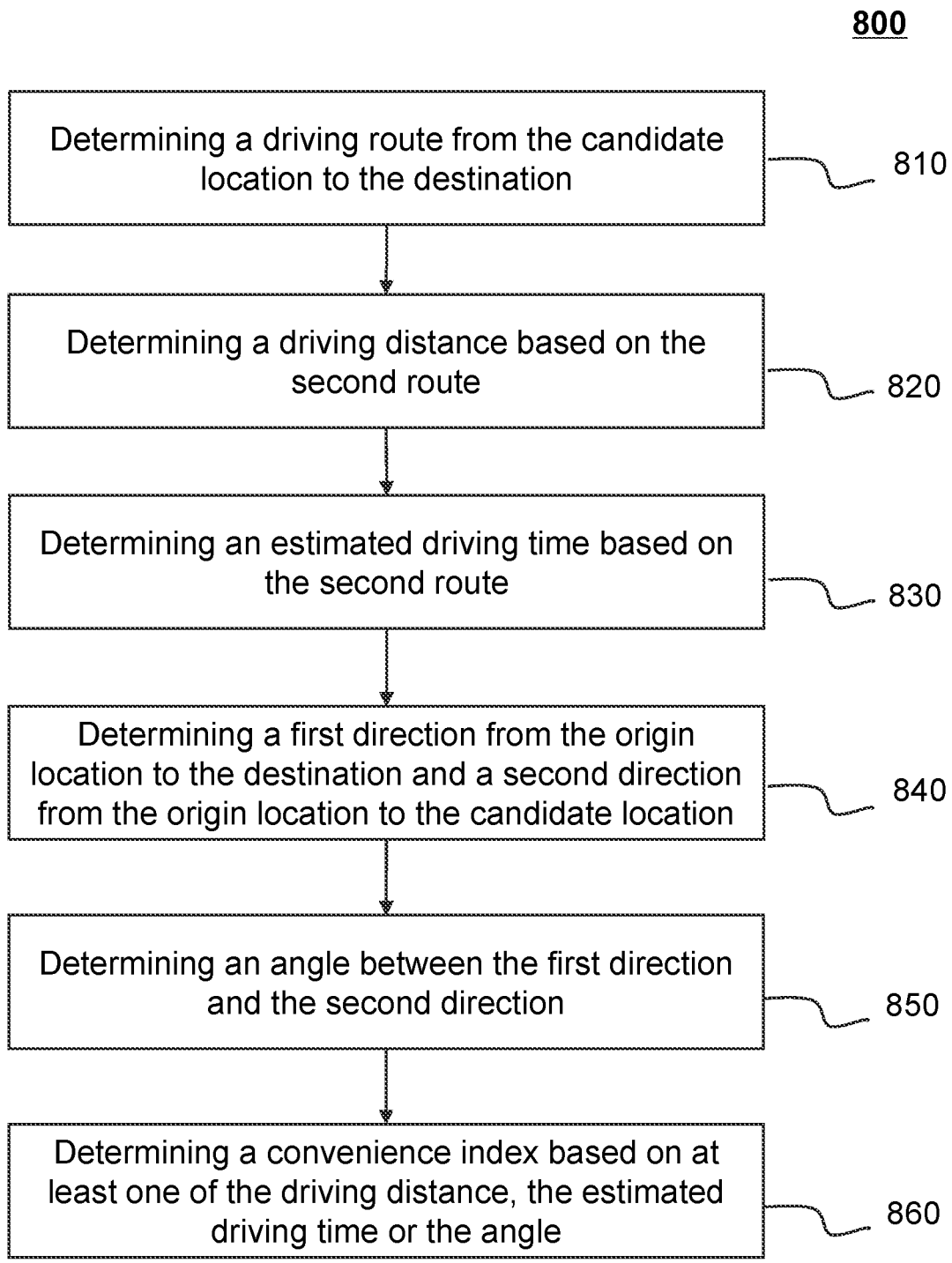
FIG. 8 is a flowchart illustrating an exemplary process for determining a convenience index for a candidate location according to some embodiments of the present disclosure.

FIG. 8 is a flowchart illustrating an exemplary process for determining a convenience index for a candidate location according to some embodiments of the present disclosure. In some embodiments, the process 800 may be implemented in the online on-demand transportation service system 100 illustrated in FIG. 1. For example, the process 800 may be stored in the storage 150 and/or the storage device (e.g., the ROM 230, the RAM 240) as a form of instructions, and invoked and/or executed by the server 110 (e.g., the processing engine 112 in the server 110, the processor 220, or one or more modules in the processing engine 112 illustrated in FIG. 4). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, step 620 illustrated in FIG. 6 may be performed based on the process 800.

In 810, the processing engine 112 (e.g., the index determining module 440) may determine a driving route from the candidate location to the destination.

In 820, the processing engine 112 (e.g., the index determining module 440) may determine a driving distance based on the driving route. The driving distance may refer to the length of the driving route.

In 830, the processing engine 112 (e.g., the index determining module 440) may determine an estimated driving time based on the driving route. In some embodiments, the processing engine 112 (e.g., the index determining module 440) may determine the estimated driving time based on the driving distance, driving speed, the condition of the driving route, or the like, or any combination thereof.

In some embodiments, the driving speed may be a fixed speed (e.g., 40 km/h), or may be adjustable depending on different situations. For example, for a high configuration vehicle (e.g., a BMW™), the driving speed may be relatively great (e.g., 45 km/h); for a low configuration vehicle (e.g., an Alto™), the driving speed may be relatively small (e.g., 35 km/h).

For a condition that the processing engine 112 has allocated a service provider to the service requester, the processing engine 112 (e.g., the index determining module 440) may determine the driving speed based on the vehicle of the service provider. In some embodiments, the service provider may input his/her basic information (e.g., a name, a phone number, a vehicle type, a vehicle plate number) when the service provider first uses the application installed in the provider terminal 140 (e.g., a smartphone of the service provider) to provide a transportation service. The provider terminal 140 may transmit the basic information of the service provider to the processing engine 112. After receiving the basic information of the service provider, the processing engine 112 may store the basic information in the storage 150 and/or the storage medium (e.g., the ROM 230, the RAM 240). When determining the driving speed, the processing engine 112 (e.g., the index determining module 440) may access the storage 150 or the storage medium to obtain the basic information of the service provider and determine the driving speed based on the basic information of the service provider. Alternatively or additionally, the provider terminal 140 may determine the driving speed of the vehicle using the positioning technology in the provider terminal 140 and transmit the driving speed to the processing engine 112 (e.g., the index determining module 440) in real time.

For a condition that the processing engine 112 has not allocated a service provider to the service requestor, the processing engine 112 (e.g., the index determining module 440) may determine the driving speed based on the default of the processing engine 112 (e.g., 40 km/h).

The condition of the driving route may include the number of vehicles on the driving route, the weather, information on events (e.g., a traffic accident, a concert), or the like, or any combination thereof.

In 840, the processing engine 112 (e.g., the index determining module 440) may determine the first direction from the origin location to the destination and a second direction from the origin location to the candidate location.

In 850, the processing engine 112 (e.g., the index determining module 440) may determine an angle between the first direction and the second direction. In some embodiments, the processing engine 112 (e.g., the index determining module 440) may determine the angle between the first direction and the second direction in order to determine whether the candidate location and the destination are in two opposite directions of the origin location. If the processing engine 112 (e.g., the index determining module 440) determines that the angle is 0°, the candidate location and the destination may be in a same direction of the origin location. If the processing engine 112 (e.g., the index determining module 440) determines that the angle is 180°, the candidate location and the destination may be in two opposite directions of the origin location. In this condition, if the service requestor goes to the candidate location to get on board from the origin location, the service requestor may be farther away from the destination, which may cause a bad user experience for the service requestor.

In 860, the processing engine 112 (e.g., the index determining module 440) may determine a convenience index based on the driving distance, the estimated driving time, or the angle between the first direction and the second direction. In some embodiments, each of the driving distance, the estimated driving time, and the angle may be indicated by a score. The shorter the driving distance is, the higher the score determined by the processing engine 112 (e.g., the index determining module 440) for the driving distance is. The shorter the estimated driving time is, the higher the score determined by the processing engine 112 (e.g., the index determining module 440) for the estimated driving time is. The smaller the angle is, the higher the score determined by the processing engine 112 (e.g., the index determining module 440) for the angle is. In some embodiments, the driving distance, the estimated driving time, and the angle may correspond to a weight, respectively. The processing engine 112 (e.g., the index determining module 440) may determine the convenience index by determining a weighted average of the driving distance, the estimated driving time, and the angle. For example, the processing engine 112 (e.g., the index determining module 440) may determine the convenience index based on Equation (3) below:

$$S_{drive} = W_{dd}S_{dd} + W_{dt}S_{dt} + W_{angle}S_{angle} \qquad (3),$$

wherein $S_{drive}$ refers to the score of the convenience index, $S_{dd}$ refers to the score of the driving distance, $S_{dt}$ refers to the score of the estimated driving time, $S_{angle}$ refers to the score of the angle, $W_{dd}$ refers to the weight of the driving distance, $W_{dt}$ refers to the weight of the estimated driving time, and $W_{angle}$ refers to the weight of the angle.

In some embodiment, the processing engine 112 (e.g., the index determining module 440) may perform step 810 and step 840 in any order. In some embodiments, the processing engine 112 (e.g., the index determining module 440) may perform step 810 and step 840 simultaneously. In some embodiment, the processing engine 112 (e.g., the index determining module 440) may perform step 820 and step 830 in any order. In some embodiments, the processing engine 112 (e.g., the index determining module 440) may perform step 820 and step 830 simultaneously.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for recommending a pickup location, comprising:
one or more storage media comprising a set of instructions for operating an online transportation service platform; and
one or more processors configured to communicate with the one or more storage media, wherein when executing the set of instructions, the one or more processors are directed to:
receive first signals from a terminal associated with a service requestor at a time point, the first signals including
a first portion of structured data encoding a request or an intention for a first transportation service,
a second portion of the structured data encoding an origin location of the first transportation service, and
a third portion of the structured data encoding a destination of the first transportation service;
transmit second signals to access the storage medium to read a plurality of candidate locations;
for each of the plurality of candidate locations, determine a matching index value of the candidate location based on the origin location or the destination, wherein the matching index value is a probability of becoming a pickup location of the first transportation service;
select one or more pickup locations from the plurality of candidate locations based on the matching index values of the plurality of candidate locations; and
transmit third signals encoding the one or more pickup locations to the terminal;
wherein the matching index value of the candidate location is determined based on a convenience index associated with the destination and the candidate location, determining the convenience index including:
determining a first route based on the candidate location and the destination;
determining a driving distance based on the first route;
determining an estimated driving time based on the first route;
determining a first direction from the origin location to the destination;
determining a second direction from the origin location to the candidate location;
determining an angle between the first direction and the second direction; and
determining the convenience index based on at least one of the driving distance, the estimated driving time or the angle.

2. The system of claim 1, wherein the plurality of candidate locations are within a predetermined distance from the origin location.

3. The system of claim 1, wherein to determine the matching index value the one or more processors are directed to:
determine a walking cost associated with the origin location and the candidate location;
determine a combination probability associated with finding a second transportation service to combine with the first transportation service; and determine the matching index value of the candidate location based on at least one of the walking cost or the combination probability.

4. The system of claim 3, wherein to determine the walking cost the one or more processors are directed to:
   determine a second route based on the origin location and the candidate location;
   determine a walking distance based on the second route;
   determine an estimated walking time based on the second route;
   determine a direct distance based on the origin location and the candidate location;
   determine a first number of historical requests associated with the candidate location; and
   determine the walking cost based on at least one of the walking distance, the estimated walking time, the direct distance or the first number.

5. The system of claim 3, wherein to determine the combination probability the one or more processors are directed to:
   determine a first determination that there is no transportation service of which a pickup location is the candidate location at the time point;
   determine a second number of historical requests associated with the candidate location and the time point in response to the first determination; and
   determine the combination probability based on the second number.

6. The system of claim 3, wherein the combination probability indicates a probability of finding the second transportation service to combine, at the candidate location, with the first transportation service, the first transportation service and the second transportation service sharing a service provider.

7. The system of claim 1, the one or more processors are further directed to:
   determine that a carpool transportation service is available for an area that the origin location locates in.

8. A method for recommending a pickup location implemented on a computing device having one or more processors and one or more storage media, the method comprising:
   receiving, by the one or more processors, first signals from a terminal associated with a service requestor at a time point, the first signals including
      a first portion of structured data encoding a request or an intention for a first transportation service,
      a second portion of the structured data encoding an origin location of the first transportation service, and
      a third portion of the structured data encoding a destination of the first transportation service;
   transmitting, by the one or more processors, second signals to access the storage medium to read a plurality of candidate locations;
   for each of the plurality of candidate locations, determining, by the one or more processors, a matching index value of the candidate location based on the origin location or the destination, wherein the matching index value is a probability of becoming a pickup location of the first transportation service;
   selecting, by the one or more processors, one or more pickup locations from the plurality of candidate locations based on the matching index values of the plurality of candidate locations; and
   transmitting, by the one or more processors, third signals encoding the one or more pickup locations to the terminal;
   wherein the matching index value of the candidate location is determined based on a convenience index associated with the destination and the candidate location, determining the convenience index including;
      determining a first route based on the candidate location and the destination;
      determining a driving distance based on the first route;
      determining an estimated driving time based on the first route;
      determining a first direction from the origin location to the destination;
      determining a second direction from the origin location to the candidate location;
      determining an angle between the first direction and the second direction; and
      determining the convenience index based on at least one of the driving distance, the estimated driving time or the angle.

9. The method of claim 8, wherein the plurality of candidate locations are within a predetermined distance from the origin location.

10. The method of claim 8, wherein the determining of the matching index value comprises:
   determining, by the one or more processors, a walking cost associated with the origin location and the candidate location;
   determining, by the one or more processors, a combination probability associated with finding a second transportation service to combine with the first transportation service; and
   determining, by the one or more processors, the matching index value of the candidate location based on at least one of the walking cost or the combination probability.

11. The method of claim 10, wherein the determining of the walking cost comprises:
   determining, by the one or more processors, a second route based on the origin location and the candidate location;
   determining, by the one or more processors, a walking distance based on the second route;
   determining, by the one or more processors, an estimated walking time based on the second route;
   determining, by the one or more processors, a direct distance based on the origin location and the candidate location;
   determining, by the one or more processors, a first number of historical requests associated with the candidate location; and
   determining, by the one or more processors, the walking cost based on at least one of the walking distance, the estimated walking time, the direct distance or the first number.

12. The method of claim 10, wherein the determining of the combination probability comprises:
   determining, by the one or more processors, a first determination that there is no transportation service of which a pickup location is the candidate location at the time point;
   determining, by the one or more processors, a second number of historical requests associated with the candidate location and the time point in response to the first determination; and
   determining, by the one or more processors, the combination probability based on the second number.

13. The method of claim 8, further comprising:
determining, by the one or more processors, that a carpool transportation service is available for an area that the origin location locates in.

14. A non-transitory computer readable medium, comprising at least one set of instructions for operating an online transportation service platform, wherein when executed by one or more processors of an electronic terminal, the at least one set of instructions directs the one or more processors to perform a method including:
receiving first signals from a terminal associated with a service requestor at a time point, the first signals including
a first portion of structured data encoding a request or an intention for a first transportation service,
a second portion of the structured data encoding an origin location of the first transportation service, and
a third portion of the structured data encoding a destination of the first transportation service;
transmitting second signals to access the storage medium to read a plurality of candidate locations;
for each of the plurality of candidate locations, determining a matching index value of the candidate location based on the origin location or the destination, wherein the matching index value is a probability of becoming a pickup location of the first transportation service;
selecting one or more pickup locations from the plurality of candidate locations based on the matching index values of the plurality of candidate locations; and
transmitting third signals encoding the one or more pickup locations to the terminal;
wherein the matching index value of the candidate location is determined based on a convenience index associated with the destination and the candidate location, determining the convenience index including;
determining a first route based on the candidate location and the destination;
determining a driving distance based on the first route;
determining an estimated driving time based on the first route;
determining a first direction from the origin location to the destination;
determining a second direction from the origin location to the candidate location;
determining an angle between the first direction and the second direction; and
determining the convenience index based on at least one of the driving distance, the estimated driving time or the angle.

15. The non-transitory computer readable medium of claim 14, wherein the plurality of candidate locations are within a predetermined distance from the origin location.

16. The non-transitory computer readable medium of claim 14, wherein the determining of the matching index value comprises:
determining a walking cost associated with the origin location and the candidate location;
determining a combination probability associated with finding a second transportation service to combine with the first transportation service; and
determining the matching index value of the candidate location based on at least one of the walking cost or the combination probability.

17. The non-transitory computer readable medium of claim 16, wherein the determining of the walking cost comprises:
determining a second route based on the origin location and the candidate location;
determining a walking distance based on the second route;
determining an estimated walking time based on the second route;
determining a direct distance based on the origin location and the candidate location;
determining a first number of historical requests associated with the candidate location; and
determining the walking cost based on at least one of the walking distance, the estimated walking time, the direct distance or the first number.

18. The non-transitory computer readable medium of claim 16, wherein the determining of the combination probability comprises:
determining a first determination that there is no transportation service of which a pickup location is the candidate location at the time point;
determining a second number of historical requests associated with the candidate location and the time point in response to the first determination; and
determining the combination probability based on the second number.

19. The non-transitory computer readable medium of claim 14, the method further including:
determining that a carpool transportation service is available for an area that the origin location locates in.

* * * * *